(12) United States Patent
Kwak

(10) Patent No.: US 8,704,994 B2
(45) Date of Patent: Apr. 22, 2014

(54) LIQUID CRYSTAL DISPLAY

(75) Inventor: Yun Hee Kwak, Seoul (KR)

(73) Assignee: Samsung Display Co., Ltd., Suwon-Si, Gyeonggi-Do (KR)

( * ) Notice: Subject to any disclaimer, the term of this patent is extended or adjusted under 35 U.S.C. 154(b) by 166 days.

(21) Appl. No.: 13/243,452

(22) Filed: Sep. 23, 2011

(65) Prior Publication Data

US 2012/0146889 A1    Jun. 14, 2012

(30) Foreign Application Priority Data

Dec. 10, 2010    (KR) .................. 10-2010-0126516

(51) Int. Cl.
  *G02F 1/13394*    (2006.01)
  *G02F 1/133707*   (2006.01)
  *G02F 1/136286*   (2006.01)
  *G02F 1/136213*   (2006.01)

(52) U.S. Cl.
  USPC ........... 349/156; 349/155; 349/141; 349/139; 349/39

(58) Field of Classification Search
  USPC .............................. 349/39, 141, 139, 155, 156
  See application file for complete search history.

(56) References Cited

U.S. PATENT DOCUMENTS

| | | | |
|---|---|---|---|
| 6,031,593 | A | 2/2000 | Morikawa et al. |
| 6,317,188 | B1 * | 11/2001 | Shibahara ..................... 349/155 |
| 6,441,879 | B2 | 8/2002 | Hiraishi et al. |
| 6,549,260 | B1 * | 4/2003 | Shibahara ..................... 349/155 |
| 6,897,935 | B2 * | 5/2005 | Matsumoto et al. .......... 349/157 |
| 7,046,327 | B2 * | 5/2006 | Okamoto et al. ............. 349/155 |
| 7,202,929 | B2 * | 4/2007 | Ootsu et al. .................. 349/141 |
| 7,616,273 | B2 | 11/2009 | Hirakata et al. |
| 7,961,287 | B2 * | 6/2011 | Kim et al. ..................... 349/155 |
| 2004/0046922 | A1 * | 3/2004 | Yanagawa et al. ........... 349/155 |
| 2005/0046779 | A1 * | 3/2005 | Sumi et al. .................... 349/155 |
| 2007/0002263 | A1 | 1/2007 | Kim et al. |
| 2008/0049176 | A1 * | 2/2008 | Kim et al. ..................... 349/114 |
| 2010/0103360 | A1 * | 4/2010 | Shimomaki ................... 349/141 |
| 2011/0149186 | A1 * | 6/2011 | Song et al. ..................... 349/42 |

FOREIGN PATENT DOCUMENTS

| | | |
|---|---|---|
| JP | 10-062789 | 3/1998 |
| JP | 3299869 | 4/2002 |
| JP | 3883641 | 11/2006 |
| JP | 2007-011272 | 1/2007 |
| JP | 4299584 | 4/2009 |
| KR | 10-0262376 | 5/2000 |
| KR | 100346872 | 7/2002 |
| KR | 1020060070873 | 6/2006 |
| KR | 10-0658544 | 12/2006 |
| KR | 1020070002457 | 1/2007 |
| KR | 1020080071662 | 8/2008 |
| KR | 10-0868003 | 11/2008 |

* cited by examiner

*Primary Examiner* — Bumsuk Won
*Assistant Examiner* — Jia Pan
(74) *Attorney, Agent, or Firm* — F. Chau & Associates, LLC

(57) ABSTRACT

A liquid crystal display according to an exemplary embodiment of the present invention includes a plurality of pixel areas, a plurality of spacers maintaining a distance between a first display panel and a second display panel, an insulating layer formed on the first display panel, and a plurality of contact holes formed in the insulating layer, and each contact hole connecting an upper conductive layer with a lower conductive layer, in which the pixel areas include a first pixel area group of pixel areas having the contact holes and a second pixel area group of pixel areas not including the contact holes, and the spacers are positioned in respective pixel areas of the second pixel area group and disposed at portions corresponding to where the contact holes are positioned in the pixel areas of the first pixel area group.

13 Claims, 10 Drawing Sheets

(a)

(b)

(c)

LIQUID CRYSTAL DISPLAY

CROSS-REFERENCE TO RELATED APPLICATION

This application claims priority to and the benefit of Korean Patent Application No. 10-2010-0126516 filed in the Korean Intellectual Property Office on Dec. 10, 2010, the entire contents of which are incorporated herein by reference.

BACKGROUND OF THE INVENTION (a) Technical Field

The present invention relates to a liquid crystal display.

(b) Discussion of the Related Art

Liquid crystal displays are popular flat panel displays, which adjust the amount of transmitted light by applying voltage to electrodes such that the liquid molecules are rearranged in the liquid crystal layer. Liquid crystal displays may have decreases thickness, but may have low side visibility in comparison to the front visibility. Various types of methods of arranging and driving liquid crystal displays have been developed to increase side visibility. A liquid crystal display in which a pixel electrode and a common electrode are formed on one substrate has been used to increase viewing angle.

However, since a pixel electrode and a reference electrode are formed on one substrate in the liquid crystal display, the parasitic capacitance between the two electrodes and the data lines may increase. Although it may be possible to increase the distance between the two electrodes and the data lines in order to reduce the parasitic capacitance, transmittance may also be reduced.

SUMMARY OF THE INVENTION

When a pixel electrode and a reference electrode are formed on one substrate in a liquid crystal display, such that the region where a spacer supporting the upper and lower substrate is formed is positioned in a pixel, the aperture ratio of the pixel may be reduced. Further, if a misalignment is generated during manufacturing the spacer, the spacer may be partially positioned at a position of a contact hole. Accordingly, the spacer may not support the upper and lower substrates well.

The embodiments of the present invention have been made in an effort to provide a liquid crystal display including a spacer that can firmly support upper and lower substrates without reducing the aperture ratio of the liquid crystal display.

An exemplary embodiment of the present invention provides a liquid crystal display including a first display panel including a plurality of pixel areas, a second display panel positioned opposite to the first display panel, a liquid crystal layer disposed between the first display panel and the second display panel, a plurality of spacers maintaining a distance between the first display panel and the second display panel, an insulating layer formed on the first display panel, and a plurality of contact holes formed in the insulating layer and each contact hole connecting an upper conductive layer with a lower conductive layer, in which the pixel areas include a first pixel area group of pixel areas having the contact holes and a second pixel area group of pixel areas not including the contact holes, and the spacers are positioned in respective pixel areas of the second pixel area group and disposed at portions corresponding to where the contact holes are positioned in the pixel areas of the first pixel area group.

The first display panel may further include a first insulation substrate, a gate line and a data line formed on the first insulation substrate, wherein the gate line and the data line are insulated from and intersect each other, a thin film transistor connected with the gate line and data line, a pixel electrode connected with the thin film transistor, and a reference electrode having a plurality of branch electrodes overlapping the pixel electrode, wherein the insulating layer is between the reference and pixel electrodes.

The liquid crystal display may further include a reference voltage line parallel with the gate line, in which the reference electrode may be connected with the reference voltage line through a contact hole of the plurality of contact holes.

The reference voltage line may further include an extender protruding from the reference voltage line, the reference electrode may be in contact with the extender through the contact hole, and a spacer of the plurality of spacers may overlap an extender protruding from a reference voltage line in a pixel area of the second pixel area group.

A branch electrode of the plurality of branch electrodes may have a first branch bent at a first predetermined angle, and a second branch that is bent at a second predetermined angle with respect to the first branch.

The reference electrode may be electrically connected to reference electrodes of adjacent pixels and may further have a longitudinal connecting portion overlapping the gate line and a transverse connecting portion overlapping the gate line.

A third branch extends from the first branch and is bent at a third predetermined angle with respect to the first branch, and the third branch is connected with the transverse connecting portion.

The longitudinal connecting portion may have a cutout extending along the data line.

The data line may include a first bend bent at the same angle as the first predetermined angle of the first branch, and a second bend bent at the same angle as the second predetermined angle of the second branch.

The pixel electrode may include a pair of curved sides, each curved side having portions parallel with the first bend and the second bend.

The liquid crystal display may further include a horizontal alignment layer on the first insulation substrate, in which the first bend makes an angle of about 5° to about 10° with respect to a rubbing direction of the alignment layer.

The second bend may make an angle of about 7° to about 15° with respect to the first bend.

The liquid crystal display may further include a color filter formed on the first display panel or the second display panel in a pixel area, in which the color filter may be any one of a red color filter, a green color filter, and a blue color filter, and the green color filter may be positioned in a pixel area of the second pixel area group.

The liquid crystal display may further include a shield electrode formed on the same layer as the gate line, separated from the gate line, and extending along the data line.

The liquid crystal display may further include a light blocking member disposed on the second display panel at a position corresponding to a spacer of the plurality of spacers.

The liquid crystal layer may have positive dielectric anisotropy.

According to exemplary embodiments of the present invention, since a contact hole is not formed at the portion where the spacer is formed, the aperture ratio is not reduced, even if the spacer is formed.

Further, since a contact hole is not formed at the portion where the spacer is positioned, it is possible to stably support the upper and lower display panels, even if misalignment is generated.

DETAILED DESCRIPTION OF THE EMBODIMENTS

Figure 1:
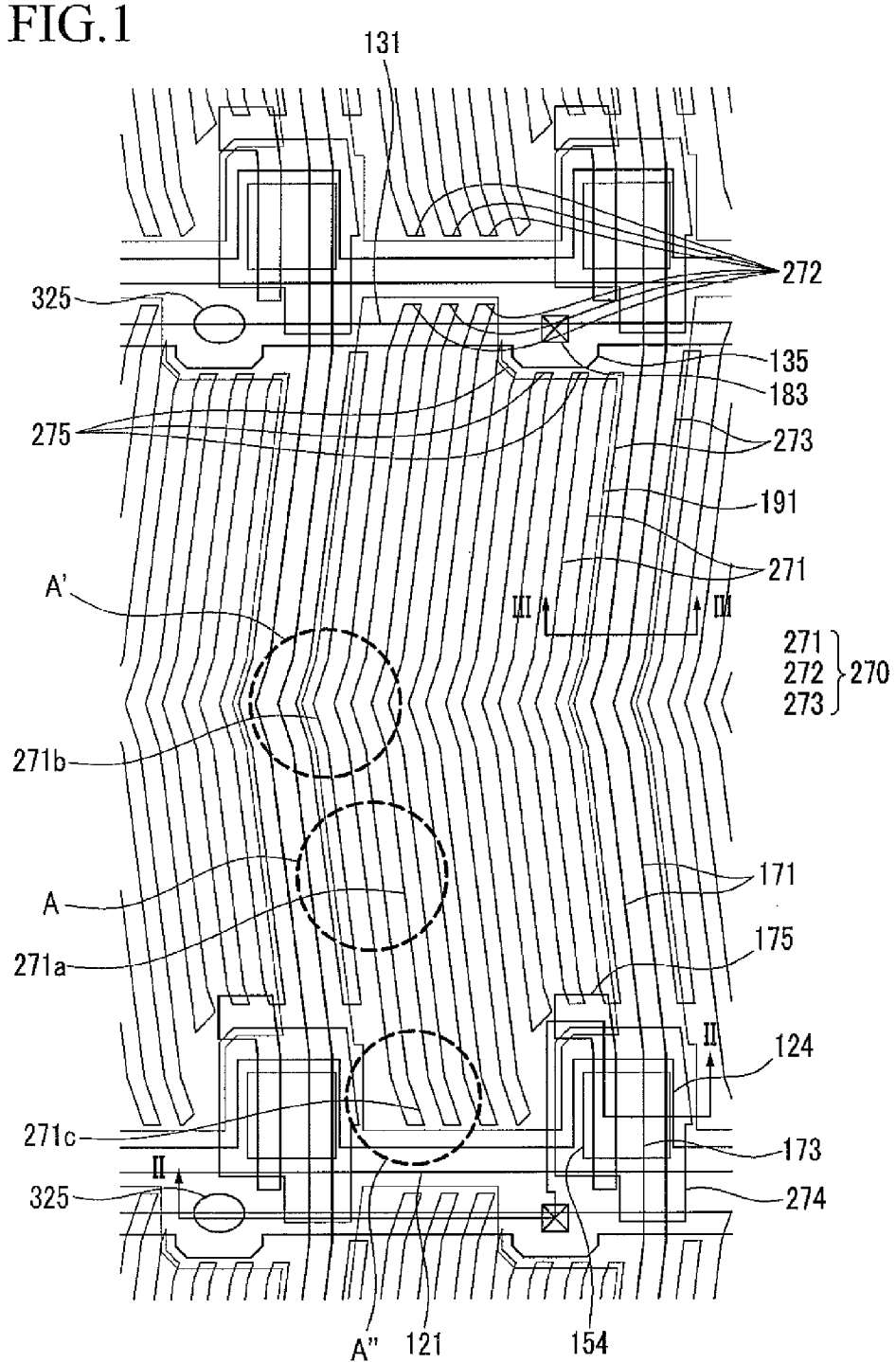
FIG. 1 is a layout view showing a liquid crystal display according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., may be exaggerated for clarity. Like reference numerals may designate like elements throughout the specification. It will be understood that when an element such as a layer, film, region, or substrate is referred to as being "on" another element, it can be directly on the other element or intervening elements may also be present.

Liquid crystal displays according to exemplary embodiments of the present invention are described hereafter with reference to the accompanying drawings.

Figure 2:
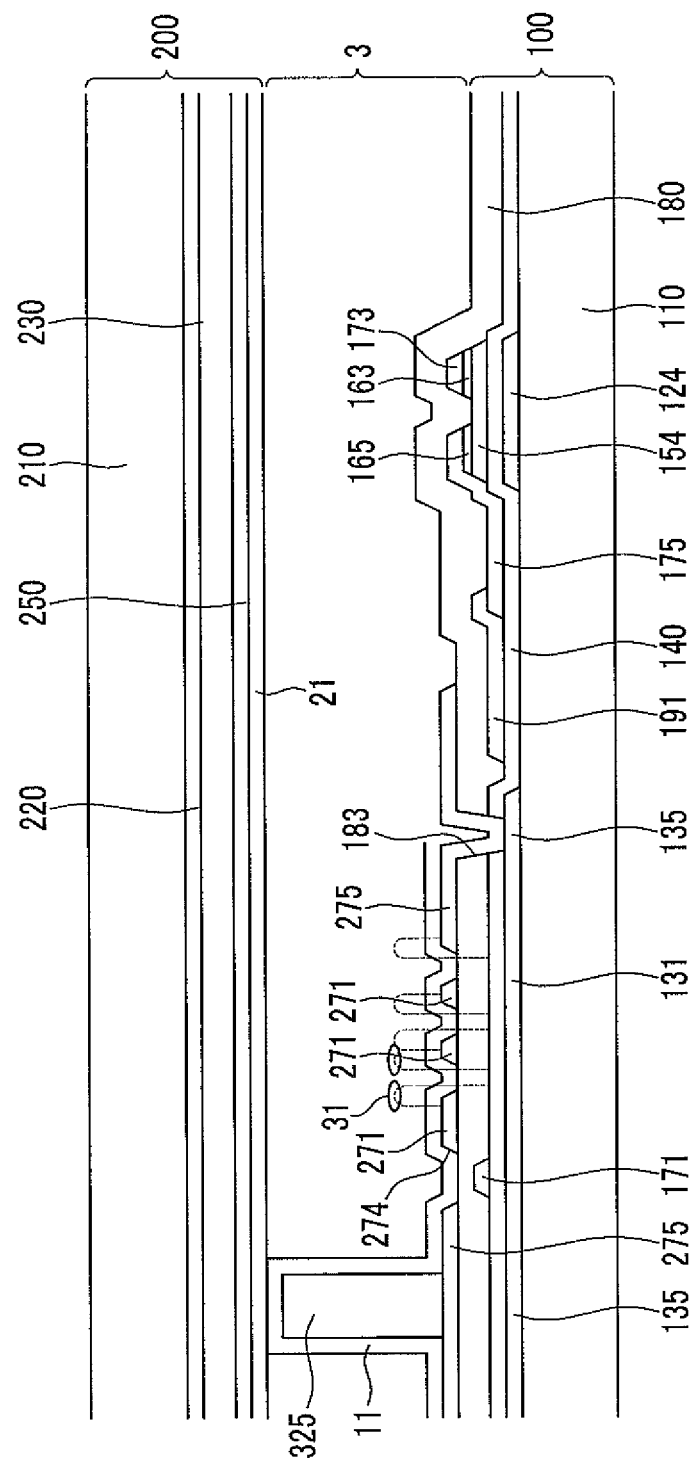
FIG. 2 is a cross-sectional view of the liquid crystal display of FIG. 1, taken along the line II-II.
Figure 3:
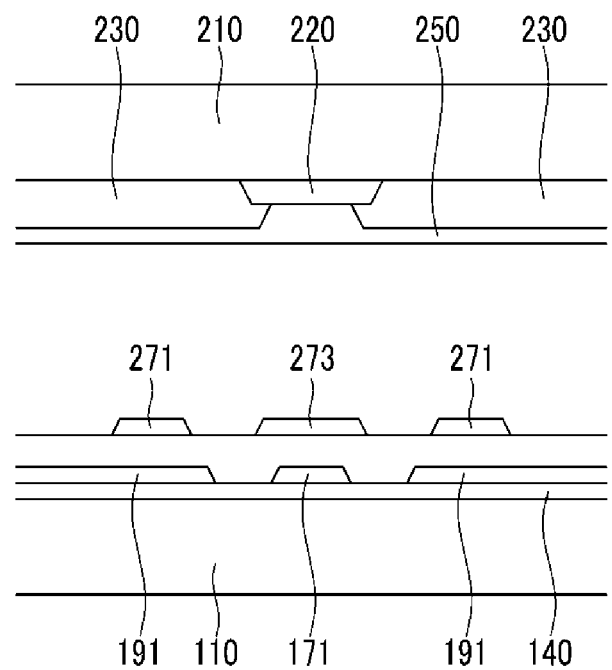
FIG. 3 is a cross-sectional view of the liquid crystal display of FIG. 1, taken along the line III-III.

FIG. 1 is a layout view showing a liquid crystal display according to an exemplary embodiment of the present invention, FIG. 2 is a cross-sectional view of the liquid crystal display of FIG. 1, taken along the line II-II, and FIG. 3 is a cross-sectional view of the liquid crystal display of FIG. 1, taken along the line III-III.

Referring to FIG. 1 to FIG. 3, a liquid crystal display according to an exemplary embodiment of the present invention includes a first display panel 100 and a second display panel 200, positioned opposite to each other, and a liquid crystal layer 3 between the display panels.

The first display panel 100 includes gate conductors including gate lines 121 and reference voltage lines 131 formed on an insulation substrate 110 made of transparent glass or plastic. The gate lines 121 each have a wide end (not shown) for connection with a gate electrode 124 and another layer or an external driving circuit. The gate lines 121 may be made of aluminum (Al) or aluminum metal, such as an aluminum alloy, silver (Ag) or silver-base metal, such as a silver alloy, copper (Cu) or copper-base metal, such as a copper alloy, molybdenum (Mo) or molybdenum metal, such as a molybdenum alloy, chromium (Cr), tantalum (Ta) and titanium (Ti). According to an embodiment, the gate lines 121 may have a multilayer structure including at least two conductive layers having different physical properties.

The reference voltage lines 131 each transmit a predetermined reference voltage and have an extender 135 for connection with a reference electrode 270. The reference voltage line 131 is connected with the reference electrode 270, and transmits the reference voltage to the reference electrode 270. According to an embodiment, the reference voltage line 131 is parallel with the gate line 121 and made of the same material as the gate line 121.

A gate insulating layer 140 made of, for example, silicon nitride (SiNx) or silicon oxide (SiOx), is formed on the gate conductors 121 and 131. The gate insulating layer 140 may have a multilayer structure including at least two insulating layers having different physical properties.

A semiconductor island 154 made of, for example, amorphous silicon or polycrystalline silicon, is formed on the gate insulating layer 140. The semiconductor island 154 at least partially overlaps the gate electrode 124.

Ohmic contacts 163 and 165 are formed on the semiconductor island 154. The ohmic contacts 163 and 165 may be made of n+ hydrogenated amorphous silicon doped with n-type impurities, such as phosphorus, in high concentration, or silicide. The ohmic contacts 163 and 165 may be disposed in pairs on the semiconductor islands 154.

Data conductors including data lines 171, which include source electrodes 173, and drain electrodes 175 are formed on the ohmic contacts 163 and 165 and the gate insulating layer 140.

Each data line 171 has a wide end (not shown) for connection with another layer or an external driving circuit. According to an embodiment, the data lines 171 transmit data signals and extend longitudinally, intersecting the gate lines 121 and the reference voltage lines 131. The data lines 171 and the gate lines 121 define pixel areas. For example, a pixel may be defined by the intersection of two data lines 171 and two gate lines 121. A data line 171 may have a first bend to achieve increased transmittance of the liquid crystal layer and the bend may form a V-shape at a middle portion of the pixel area. The data line 171 at a middle portion of the pixel area may further include a second bend making a predetermined angle with the first bend.

The first bend of the data line 171 may be curved at an angle of about 7° with respect to the rubbing direction of an alignment layer. The second bend may be further curved at an angle of about 7° to 15° with respect to the first bend.

The source electrode 173 is a portion of the data line 171 and disposed in the same line with the data line 171. The drain electrode 175 extends parallel to the source electrode 173. Therefore, the drain electrode 175 is parallel with a portion of the data line 171.

A gate electrode 124, source electrode 173 and drain electrode 175 constitute one thin film transistor (TFT), together with a semiconductor island 154. The channel of the thin film transistor is formed at the semiconductor island 154 between the source electrode 173 and the drain electrode 175.

Since the liquid crystal display according to an exemplary embodiment of the present invention includes the source electrode 173 in the same line with the data line 171 and the drain electrode 175 extending in parallel with the data line 171, it is possible to increase the width of the thin film transistor without increasing the area of the data conductor, such that the aperture ratio of the liquid crystal display can be increased.

According to an embodiment, the data line 171 and the drain electrode 175 may be made of refractory metal, such as molybdenum, chromium, tantalum, and titanium, or alloys of thereof, and may have a multilayer structure including a refractory metal layer (not shown) and a row-resistant conductive layer (not shown). The multilayer structure, for example, may be a double layer including a lower layer of chromium, chromium alloy, molybdenum or molybdenum alloy, and an upper layer including aluminum or aluminum alloy. Alternatively, the multilayer structure may be a triple layer including a lower layer of molybdenum or molybdenum alloy, a middle layer of aluminum or aluminum alloy, and an upper layer of molybdenum or molybdenum alloy. According to an embodiment, the data line 171 and the drain electrode 175 may be made of a variety of metals and conductors, other than those set forth above. The width of the data line 171 may be about 3.5 μm±0.75 μm.

A pixel electrode 191 is formed on a portion of the drain electrode 175 and the gate insulating layer 140.

The pixel electrode 191 has a pair of curved edges substantially parallel with the first bend and the second bend of the data line 171.

The pixel electrode 191 covers a portion of the drain electrode 175 and is physically and electrically connected with the drain electrode 175. According to an embodiment, the pixel electrode is directly physically and electrically connected with the drain electrode 175.

The pixel electrode 191 may be made of a transparent conductive material, such as a single crystalline, polycrystalline, or amorphous ITO (Indium tin oxide) or IZO (Indium zinc oxide).

A passivation layer 180 is formed on the data conductors 171, 173 and 175, the exposed portion of semiconductor island 154, and the pixel electrode 191. The passivation layer 180 is made of, for example, an inorganic insulator, such as silicon nitride and silicon oxide. Alternatively, the passivation layer 180 may be made of an organic insulator, and have a flat surface. A passivation layer made of an organic insulator may be photosensitive and the dielectric constant thereof may be about 4.0 or less. According to an embodiment, the passivation layer 180 may have a double layer structure of a lower inorganic layer and an upper organic layer to prevent damage to the exposed portions of the semiconductor island 154, while maintaining the relatively good insulating characteristics of the organic layer. The thickness of the passivation layer 180 may be about 5000 Å or more, and may be about 6000 Å to 8000 Å.

A contact hole (not shown) exposing an end of the data line is formed through the passivation layer 180, and a contact hole 183 exposing a connecting portion 135 of the reference voltage line 131 and a contact hole (not shown) exposing an end of the gate line 121 are formed through the passivation layer 180 and the gate insulating layer 140.

The reference electrode 270 is formed on the passivation layer 180. The reference electrode 270 overlaps the pixel electrode 191 and includes a plurality of branch electrodes 271 and transverse connecting portions 272 connecting the branch electrodes 271 to each other. The reference electrode 270 also includes longitudinal connecting portions 273 that extend above the data line 171 between two adjacent pixels. Transverse connecting portions 272 located at ends of the longitudinal connecting portions 273 connect a longitudinal connecting portion 273 to a branch electrode 271. The reference electrode 270 is made of a transparent conductive material, such as a single crystalline, polycrystalline, or amorphous ITO (Indium tin oxide) or IZO (Indium zinc oxide). The reference electrodes 270 in adjacent pixels are connected to each other by the connecting portions 272 and 273.

Figure 4:
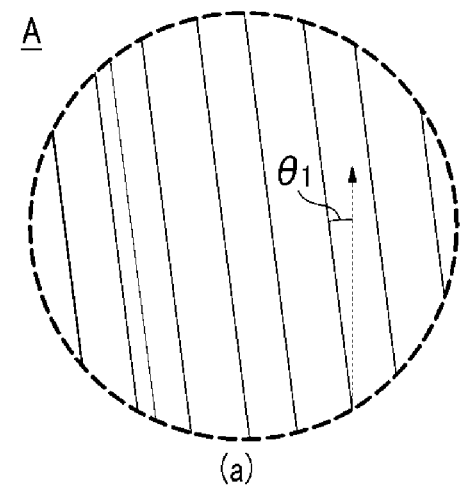
FIGS. 4(a) to 4(c) are enlarged views showing portions A, A' and A" of the liquid crystal display of FIG. 1.
Figure 4:
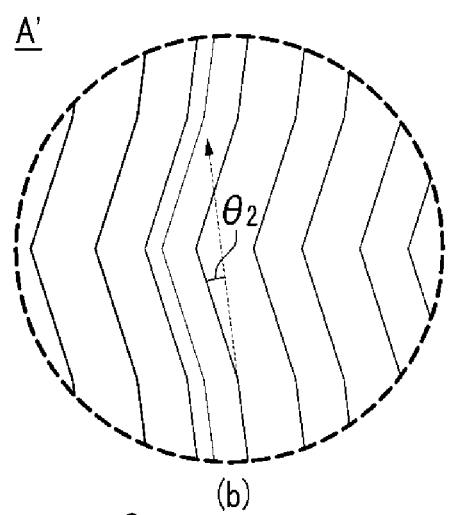
Figure 4:
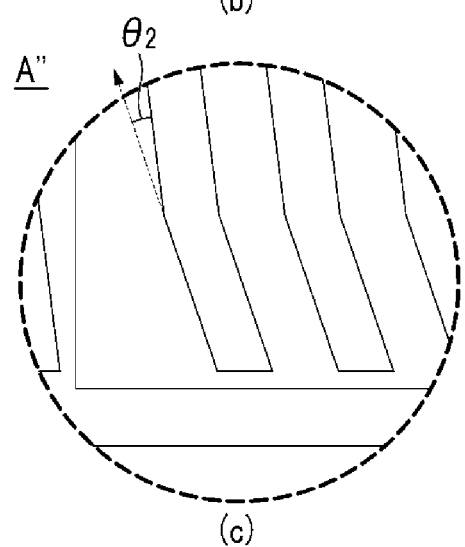

Referring to FIGS. 1 and 4, the branch electrode 271 of the reference electrode 270 has a first branch 271a (see A) and a second branch 271b (see A') which are parallel with the first bend and the second bend of the data line 171, respectively. The first branch 271a makes an angle of about 5° to 10° with respect to the rubbing direction of the alignment layer, for example, about 7°, and the second branch 271b may be further curved at an angle of about 7° to 15° with respect to the first branch 271a.

The transverse connecting portion 272 of the reference electrode 270 is substantially parallel with the gate line 121 and connects upper and lower ends of the branch electrodes 271. The transverse connecting portion 272 of the reference electrode 270 under the pixel area has a cutout 274 exposing some of the gate electrode 124 of the thin film transistor, the semiconductor island 154, the data line 171, the drain electrode 175, the source electrode 173, and the reference voltage line 131. The transverse connecting portion 272 of the reference electrode 270 has a reference electrode extender 275 extending toward the extender 135 of the reference voltage line 131. The reference electrodes 270 in adjacent pixels are connected with each other.

The branch electrode 271 of the reference electrode 270 further has a third branch 271c (see A") curved at a predetermined angle at the portion connected with the transverse connecting portion 272 of the reference electrode 270. The third branch 271c may be curved at about 7° to 15° with respect to the first branch 271a. That is, in the reference electrode 270, the acute angle between the first branch 271a of the branch electrode 271 and the transverse connecting portion 272 is about 7° to 15° larger than the acute angle between the second branch 271b and the transverse connecting portion 272 or the acute angle between the third branch 271c and the transverse connecting portion 272.

The longitudinal connecting portion 273 of the reference electrode 270 extends above the data line 171 between two adjacent pixels and has the cutout 274 above a portion of the data line 171.

According to an embodiment, the cutout 274 of the reference electrode 270 fully exposes the portion of the data line 171 having the source electrode 173 and may have a longitudinal width of about 30 μm to about 60 μm.

The extender 275 of the reference electrode 270 is physically and electrically connected with the reference voltage line 131 through the contact hole 183, which is formed through the passivation layer 180 and the gate insulating layer 140.

The alignment layer 11 is formed on the reference electrode 270 and the passivation layer 180 and it may be a horizontal alignment layer that is rubbed in a predetermined direction. The rubbing direction of the alignment layer may make an angle of about 5° to 10°, for example, about 7° from the extension direction of the first branch 271a of the branch electrode of the reference electrode 270.

The second display panel 200 includes a light blocking member 220 formed on the insulation substrate 210. The insulation substrate is made of, for example, transparent glass or plastic. The light blocking member 220 is, for example, a black matrix and prevents light leakage.

A plurality of color filters 230 is also formed on the substrate 210. Most of the color filters 230 are in a region surrounded by the light blocking member 220 and may extend longitudinally along a row direction of the pixel electrode 191. The color filters 230 may each show one of the three primary colors of red, green, and blue.

An overcoat 250 is formed on the color filter 230 and the light blocking member 220. The overcoat 250 may be made of an insulator, such as an organic insulator, and prevents the color filter 230 from being exposed. Further, the overcoat provides a flat surface. An alignment layer 21 may be formed on the overcoat 250. The overcoat 250 may be optionally provided.

The liquid crystal layer 3 includes a nematic liquid crystal material having positive dielectric anisotropy. The liquid crystal molecules of the liquid crystal layer 3 have their long axis parallel with the display panels 100 and 200 and the long axis is spirally twisted at 90° from the rubbing direction of the alignment layer of the first display panel 100 to the second display panel 200.

The pixel electrode 191 receives a data voltage from the drain electrode 175 and the reference electrode 270 receives a reference voltage having a predetermined magnitude from the reference voltage line 131. The reference electrodes 270 are connected to and receive the reference voltage from a reference voltage source outside the display area. Each of the reference electrodes 270 receives the same magnitude of reference voltage from the reference voltage lines 131 to prevent voltage drop in the display area.

The pixel electrode 191 that has received the data voltage generates an electric field together with the reference electrode 270 that has received the reference voltage, such that the liquid crystal molecules in the liquid crystal layer 3 rotate in parallel with the direction of the electric field. Polarization of light transmitted through the liquid crystal layer depends on the rotational direction of the liquid crystal molecules.

The liquid crystal molecules 31 in the liquid crystal layer 3 of the liquid crystal display are rotated by the electric field generated between the side of the branch electrode 271 of the reference electrode 270 and the pixel electrode 191. In the liquid crystal display according to an exemplary embodiment of the present invention, the alignment layer is rubbed such that the liquid crystal molecules 31 in the liquid crystal layer 3 are pre-inclined at a predetermined angle and the rubbing angle is about 5° to 10°, for example, about 7° with respect to the branch electrode 271 of the reference electrode 270, such that the liquid crystal molecules 31 can rapidly rotate to the pre-inclination direction.

The pixel electrode 191 of the liquid crystal display according to an exemplary embodiment of the present invention is disposed between the gate insulating layer 140 and the passivation layer 180. According to an embodiment, the pixel electrode is physically and electrically directly connected to the drain electrode 175, covering a portion of the drain electrode 175, such that the aperture ratio increases relative to liquid crystal displays in which the pixel electrodes are connected to the drain electrodes 175 through contact holes.

Further, since the liquid crystal display according to an exemplary embodiment of the present invention includes the source electrode 173 in the same line with the data line 171, and the drain electrode 175 extending partially in parallel with the data line 171, it is possible to increase the width of the thin film transistor without increasing the area for the data conductor. Accordingly, the aperture ratio of the liquid crystal display can be increased.

Further, in the liquid crystal display according to an exemplary embodiment of the present invention, since the reference electrode 270 on the passivation layer 180 includes the cutout 274 exposing portions of the gate electrode 124, and the semiconductor island 154, and exposing a portion of the data line 171 including the source electrode 173 and the drain electrode 175, it is possible to reduce parasitic capacitance between the data line 171 and the reference electrode 270.

Parasitic capacitance between the data line 171 and the reference electrode 270 of the liquid crystal display according to an experimental example of an embodiment of the present invention is described hereafter With reference to Table 1.

Table 1 shows the results comparing parasitic capacitances between the data line 171 and the reference electrode 270 of the liquid crystal display according to an experimental example of an embodiment of the present invention. The experimental example compared the parasitic capacitances between the data line 171 and the reference electrode 270 while changing the shapes of the data line 171 and the drain electrode 175, the cutout of the reference electrode 270, the line width of the data line 171, and the thickness of the passivation layer 180.

TABLE 1

| A | 71.0% |
|---|---|
| B | 62.1% |
| C | 49.6% |

Table 1 shows the results calculating ratios of parasitic capacitances of each case, on the basis of parasitic capacitance between the reference electrode 270 and the data line 171 of a common liquid crystal display including a U-shaped drain electrode and an organic insulating layer between the reference electrode 270 and the data line 171. Case (A), like the liquid crystal display according to an exemplary embodiment of the present invention, includes a source electrode 173 in the same line with the data line 171 and a drain electrode 175 extending in parallel with the data line 171. Also, in case (A), the reference electrode 270 has a cutout 274 exposing a portion of the gate electrode 124, a semiconductor island 154, and exposing a portion of the data line 171 including the source electrode 173, the drain electrode 175, and a portion of a reference voltage line 131. In case (B), the line width of the data line of case (A) is about 3.5 µm. In case (C), the thickness of the passivation layer 180 of case (B) is about 8000 Å.

Referring to Table 1, it can be seen that the parasitic capacitance between the reference electrode 270 and the data line 171 is reduced by about 71.0% in case (A), by about 62.1% in case (B), by adjusting the line width of the data line 171, and by about 49.6% in case (C), by adjusting the thickness of the passivation layer 180, in liquid crystal displays according to exemplary embodiments of the present invention, as compared with the existing liquid crystal displays.

As described above, it could be seen that the liquid crystal displays according to exemplary embodiments of the present invention reduce the parasitic capacitance between the data line 171 and the reference electrode 270. As a result, the reduction of image quality due to the parasitic capacitance is reduced, without decreasing the aperture ratio and complicating the manufacturing process of the liquid crystal displays.

Shapes of the reference electrode 270 and the branch electrode 271 of the liquid crystal display according to an exemplary embodiment of the present invention are described with reference to FIG. 4. FIG. 4 is an enlarged view showing portions of the liquid crystal display of FIG. 1.

Referring to FIG. 4A, the first branch 271a of the branch electrode 271 is inclined at a first angle $\theta 1$ with respect to the rubbing direction of the alignment layer 11 on the first display panel 100. As described above, the first angle $\theta 1$ may be about 5° to 10°, for example, 7°. Referring to FIG. 4B, the second branch 271b of the branch electrode 271 is curved at a second angle $\theta 2$ with respect to the first branch 271a, and referring to FIG. 4C, the third branch 271c of the branch electrode 271 is curved at the second angle θ2 with respect to the first branch 271a. The second angle θ2 is about 7° to 15°.

It is possible to change the generation directions of electric fields at the center portion and the edge of the pixel area by dividing the branch electrode 271 of the reference electrode 270 into the first branch 271a, the second branch 271b, and the third branch 271c, as described above. In general, the direction of an electric field is different at the end of a branch electrode than from the center portion of the branch electrode, such that the rotational direction of the liquid crystal becomes non-uniform, and a texture may be caused when an electric field is applied to the liquid crystal layer. However, since the liquid crystal display according to an exemplary embodiment of the present invention includes the second branch 271b and the third branch 271c which are disposed at the end of the first branch 271a and curved at the angles larger than the first branch 271a, it is possible to rotate the liquid crystal molecules of the liquid crystal layer 3 in a predetermined direction by changing the direction of the electric field applied to the liquid crystal layer 3. Further, the rotational direction can be determined when the liquid crystal molecules 31 rotate, by the second branch 271b and the third branch 271c, which are curved at angles larger than the first branch 271a. Therefore, it is possible to prevent a texture due to non-uniform rotation of the liquid crystal molecules 31 at the interfaces of the center portion or the upper and lower interfaces of the pixel area. Further, since it is possible to make the rotational angles of the liquid crystal molecules 31 different by dividing the branch electrode 271 into the first branch 271a, the second branch 271b, and the third branch 271c, it is possible to increase the viewing angle of the liquid crystal display and compensate the color tone of the liquid crystal display.

Figure 5:
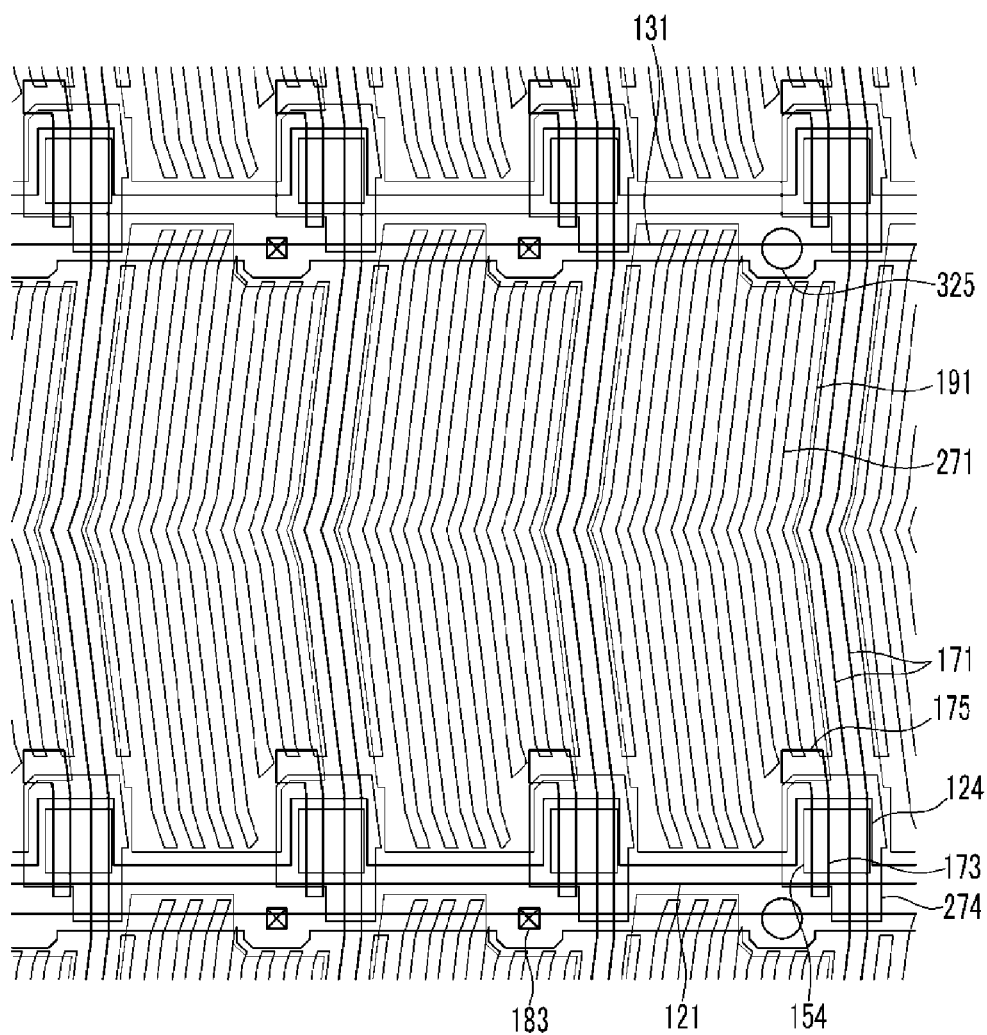
FIG. 5 is a layout view of a liquid crystal display showing a plurality of the pixels shown in FIG. 1.

Hereafter, disposing a spacer in the liquid crystal display according to an exemplary embodiment of the present invention is described with reference to FIG. 5. FIG. 5 shows a plurality of the pixels shown in FIG. 1.

Referring to FIG. 5, a liquid crystal display according to an exemplary embodiment includes at least three adjacent pixels, which are adjacent in a row direction, and a spacer 325 is formed in at least one of the three adjacent pixels where the contact hole 183 is formed in the other pixels. The spacer 325 may be disposed on the extender 135 of the reference voltage line 131.

A contact hole 183 connecting the reference voltage line 131 with the reference electrode 270 is not formed at the pixel with the spacer 325, and the contact holes 183 are formed at the other pixels of the three adjacent pixels. So the reference voltage line 131 and the reference electrode 270 can be connected by the contact hole 183 at the other pixels of the three adjacent pixels.

Assuming that the pixels with the contact holes 183 are a first pixel area group and the pixels without the contact holes 183 are a second pixel area group, the spacers 325 are positioned only at the pixels in the second pixel area group.

The surface where the spacer 325 is formed is smooth due to the absence of the contact hole 183, as in an exemplary embodiment of the present invention. Accordingly, even if misalignment occurs, the disclosed embodiment, because there is no contact hole formed where the spacer is located, prevents the spacer 325 from being deviated from the contact hole and unstably supporting the upper and lower substrates.

The light blocking member 220 in the second pixel area group may fully overlap the spacer 325 by partially extending at the portion corresponding to the spacer 325. Therefore, the aperture ratio of the pixel with the spacer 325 may be smaller when compared to the other pixels not having the spacer 325.

The three adjacent pixels can show different colors, such as red, green, and blue, and the pixel with the spacer 325, which has the smallest aperture ratio, may be a green pixel.

To the extent possible, without changing the configuration of the embodiment in FIG. 5, some or all of the features of the liquid crystal display which has been described above with reference to FIG. 1 to FIG. 3 can be applied to the exemplary embodiment shown in FIG. 5.

Figure 6:
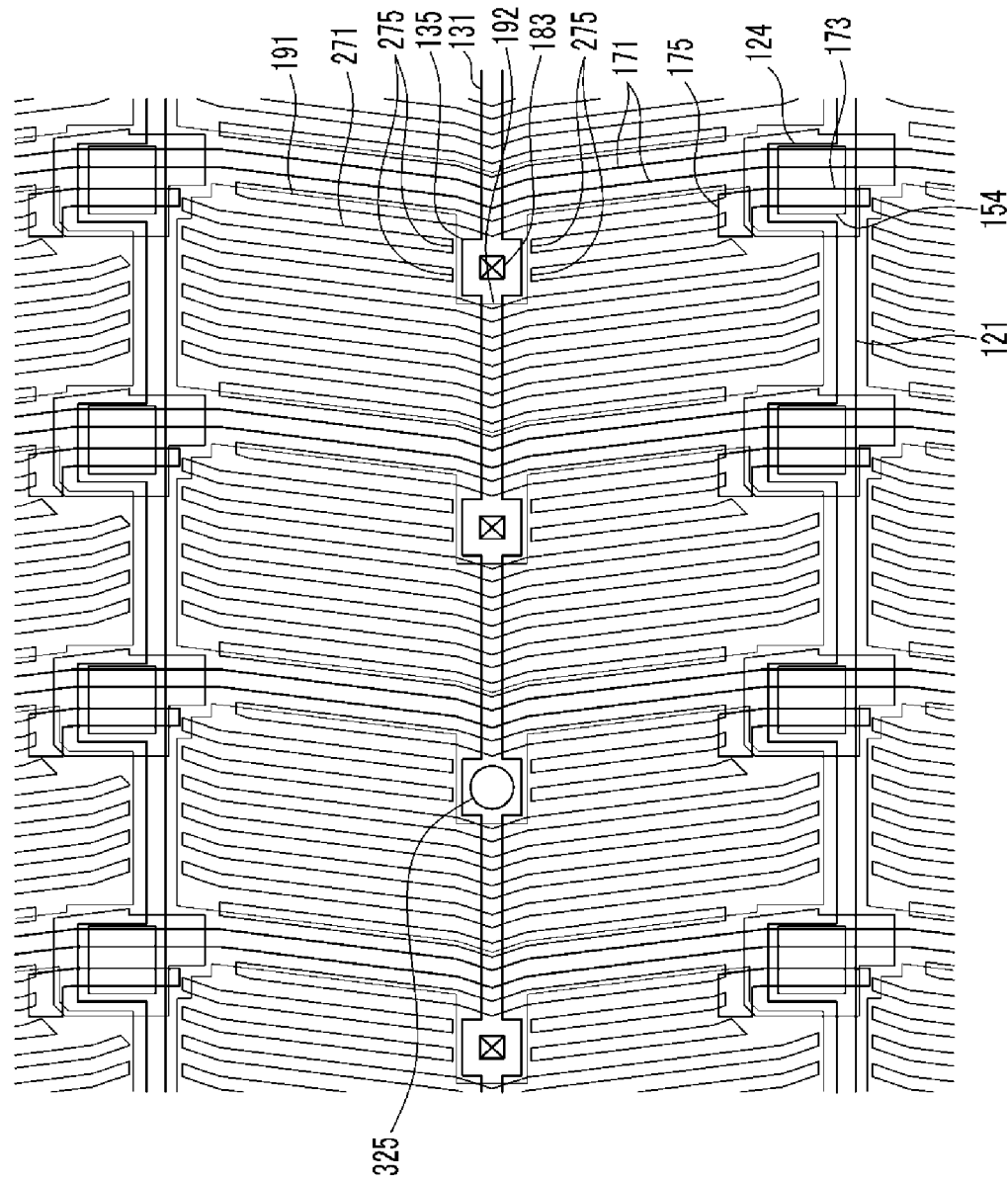
FIG. 6 is a layout view of a liquid crystal display according to an exemplary embodiment of the present invention, showing a plurality of pixels.

A liquid crystal display according to an exemplary embodiment of the present invention is described hereafter with reference to FIG. 6. FIG. 6 is a layout view of a liquid crystal display according to an exemplary embodiment of the present invention, showing a plurality of pixels.

The layer structure of the liquid crystal display shown in FIG. 6 is substantially the same as that of the liquid crystal display shown in FIG. 1 to FIG. 3.

However, unlike the liquid crystal display shown in FIG. 1 to FIG. 3, instead of being positioned immediately next to the gate line 121, the reference voltage line 131 is disposed at the center portion of the pixel area in the liquid crystal display according to the exemplary embodiment shown in FIG. 6. Further, the extender 135 of the reference voltage line 131 is also disposed at the center portion of the pixel area and the reference electrode extender 275 is also disposed at the center portion of the pixel area.

The contact hole 183 connecting the reference voltage line 131 with the reference electrode 270, the extender 135 of the reference voltage line 131, and the extender 275 of the reference electrode 270 may be formed in two of the three adjacent pixels, while a contact hole 183 may not be formed in the remaining one pixel. Therefore, the reference voltage line 131 and the reference electrode 270 can be connected through the contact hole 183 in two of three adjacent pixels. The contact portion between the reference voltage line 131 and reference electrode 270 may be disposed adjacent to the data line in the pixel area.

In the pixel where the reference voltage line 131 is connected with the reference electrode 270 by the contact hole 183, the pixel electrode 191 is removed at the portions corresponding to the extender 135 of the reference voltage line 131, the contact hole 183, and the extender 275 of the reference electrode 270, such that the portion of the pixel electrode adjacent to the data line 171 at the edge of the pixel electrode 191 may have a recess portion 192 surrounding the contact portion between the reference voltage line 131 and the reference electrode 270. Therefore, the pixel electrode 191 between the reference voltage line 131 and the reference electrode 270 is removed at the contact portion between the reference voltage line 131 and the reference electrode 270, such that it is possible to prevent a short between the reference electrode 270 and the pixel electrode 191. In addition, the recess portion 192 is also formed when the spacer 325 is formed in place of the contact hole 183.

The contact hole 183 connecting the reference voltage line 131 with the reference electrode 270, the extender 135 of the reference voltage line 131, and the extender 275 of the reference electrode 270 is formed in two of the three adjacent pixels. The aperture ratio of the pixel where the reference voltage line 131 and the reference electrode 270 are physically and electrically connected through the contact hole 183 may be slightly smaller than those of the other pixel.

The three adjacent pixels may show different colors and the pixel where the reference voltage line 131 and the reference electrode 270 are physically and electrically connected, and which has the smallest aperture ratio, may be a green pixel.

By connecting the reference voltage line 131 with the reference electrode 270 only in a predetermined pixel, as described above, it is possible to increase the aperture ratios of the other pixels, and accordingly the entire aperture ratio of the liquid crystal display can be increased.

To the extent possible, without changing the configuration of the embodiment in FIG. 6, some or all of the of the features of the liquid crystal display that has been described with reference to FIG. 1 to FIG. 3, and FIG. 5 can be applied to the exemplary embodiment shown in FIG. 6.

Figure 7:
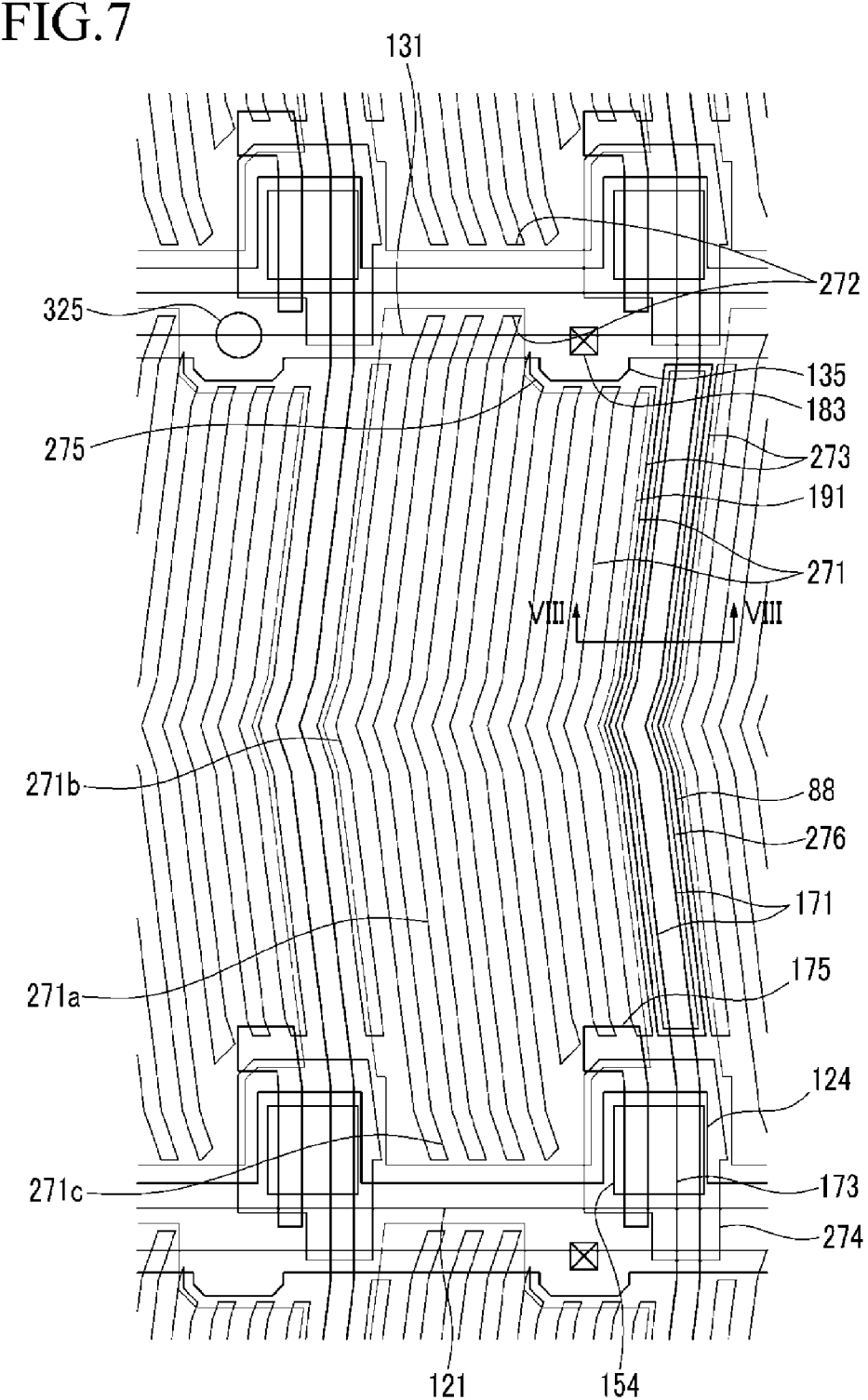
FIG. 7 is a layout view showing a portion of a liquid crystal display according to a exemplary embodiment of the present invention.

A liquid crystal display according to an exemplary embodiment of the present invention is described with reference to FIG. 7 and FIG. 8. FIG. 7 is a layout view showing a portion of a liquid crystal display according to an exemplary embodiment of the present invention and FIG. 8 is a cross-sectional view of the liquid crystal display of FIG. 7, taken along the line VIII-VIII.

Figure 8:
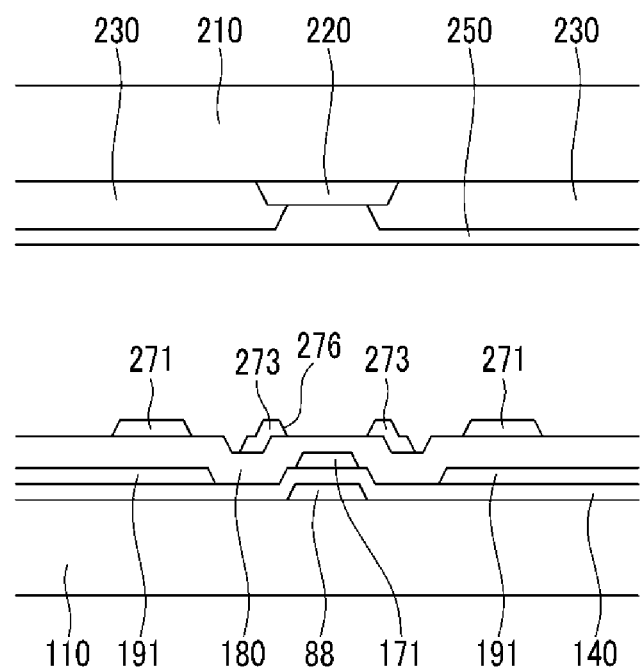
FIG. 8 is a cross-sectional view of the liquid crystal display of FIG. 7, taken along the line VIII-VIII.

The layer structure of the liquid crystal display shown in FIG. 7 and FIG. 8 is substantially the same as that of the liquid crystal display shown in FIG. 1 to FIG. 3.

However, in the liquid crystal display shown in FIG. 7 and FIG. 8, unlike the liquid crystal display shown in FIG. 1 to FIG. 3, a shield electrode 88 is formed under the data line 171 and the longitudinal connecting portion 273 of the reference electrode 270 extending above the data line 171 has a second cutout 276 above the data line 171. The shield electrode 88 may be formed on the same layer as the gate conductor and floated. The shield electrode 88 can prevent light leakage. The second cutout 276 of the reference electrode 270 on the data line 171 may be about 50% or more of the longitudinal length of the data line 171 in one pixel area. It is possible to further reduce the parasitic capacitance between the data line 171 and the reference electrode 270 by forming the second cutout 276 at the reference electrode 270 on the data line 171.

To the extent possible, without changing the configuration of the embodiment in FIG. 7, some or all of the features of the liquid crystal display that has been described with reference to FIG. 1 to FIG. 3, FIG. 5, and FIG. 6 can be applied to the exemplary embodiment shown in FIG. 7.

Figure 9:
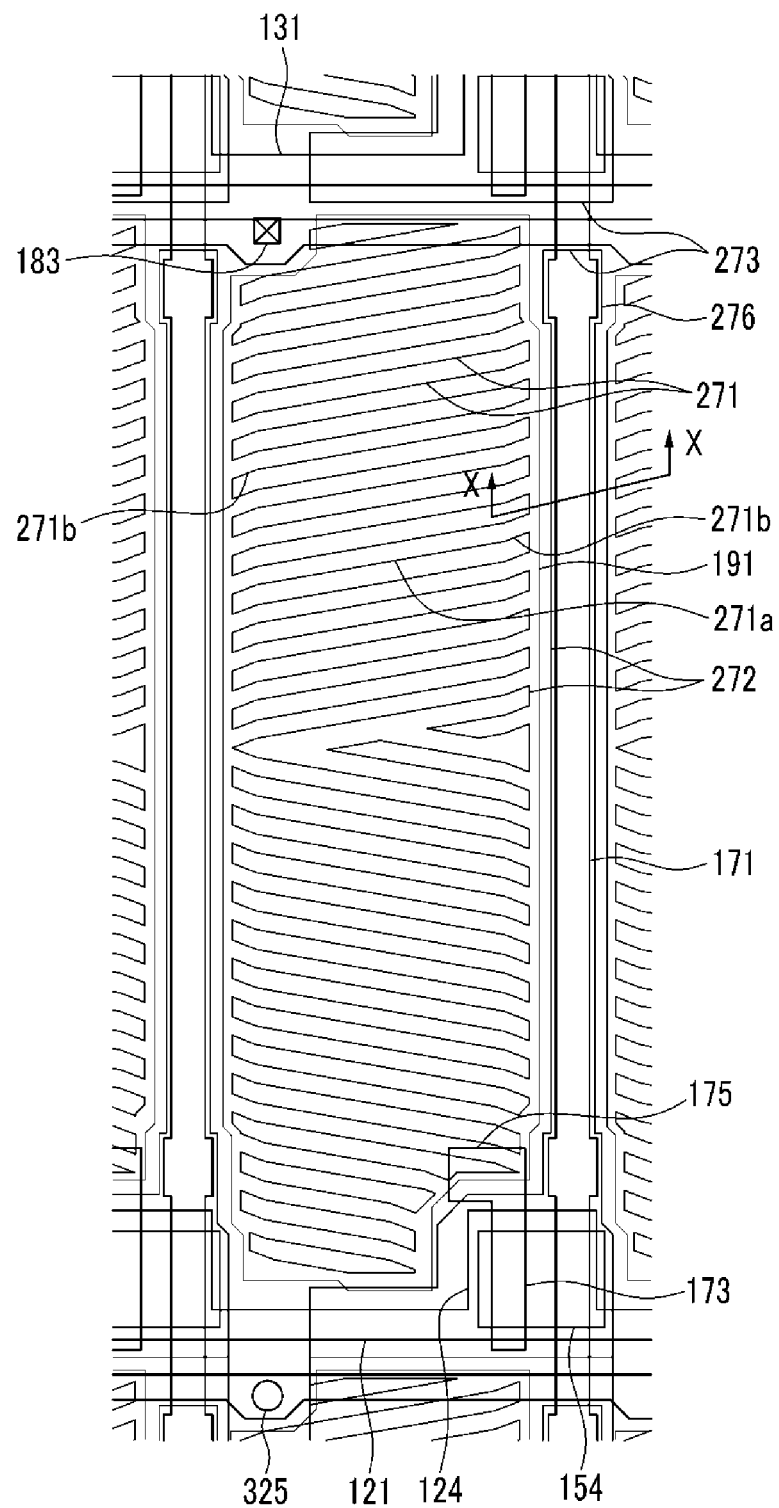
FIG. 9 is a layout view showing a portion of a liquid crystal display according to an exemplary embodiment of the present invention.

A liquid crystal display according to an exemplary embodiment of the present invention is described with reference to FIG. 9 and FIG. 10. FIG. 9 is a layout view showing a portion of a liquid crystal display according to an embodiment of the present invention and FIG. 10 is a cross-sectional view of the liquid crystal display of FIG. 9, taken along the line X-X.

Figure 10:
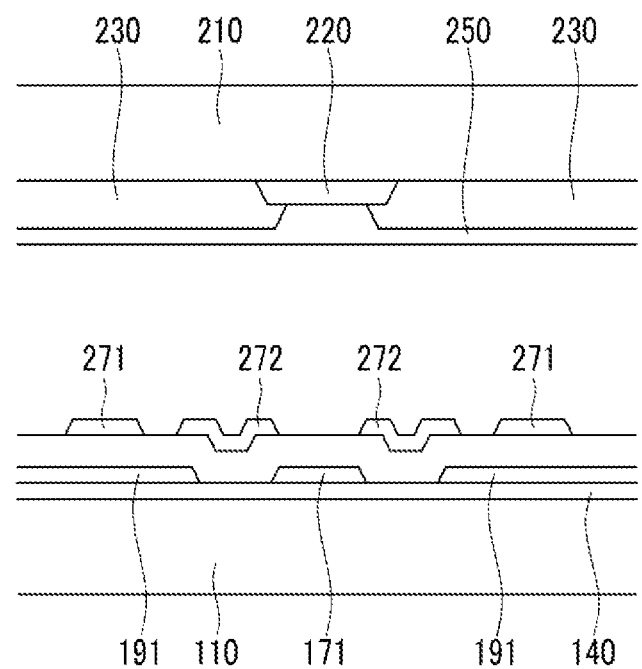
FIG. 10 is a cross-sectional view of the liquid crystal display of FIG. 9, taken along the line X-X.

The layer structure of the liquid crystal display shown in FIG. 9 and FIG. 10 is substantially the same as that of the liquid crystal display shown in FIG. 1 to FIG. 3.

A gate line 121 including a gate electrode and a reference voltage line 131 may be formed on the substrate 110, a gate insulating layer 140 may be formed on the gate line 121 and the reference voltage line 131, a semiconductor island 154 and ohmic contacts 163 and 165 may be formed on the gate insulating layer 140, and a data line 171 including a source electrode 173 and a drain electrode 175 may be formed on the gate insulating layer 140 and the ohmic contacts 163 and 165. The pixel electrode 191 is partially formed on the gate insulating layer 140 and the drain electrode 175, and a passivation layer 180 having a contact hole 183 is formed on the pixel electrode 191, the data line 171, the drain electrode 175, and the exposed portion of the semiconductor island 154. A reference electrode 270 overlapping the pixel electrode 191 and having a branch electrode 271 is formed on the passivation layer 180.

However, the data line 171 extends substantially perpendicular to the gate line 121, unlike the liquid crystal display shown in FIG. 1 to FIG. 3.

The branch electrode 271 of the reference electrode 270 extends substantially in parallel with the gate line 121 and may be inclined at an angle of about 5° to about 20° with respect to the gate line 121. Further, the branch electrode 271 of the reference electrode 270 may be inclined at about 7° to 13°, for example, 10° with respect to the rubbing direction of the alignment layer.

The branch electrode 271 of the reference electrode 270 has a first branch 271a extending in a predetermined direction and second branches 271b disposed adjacent to the first connecting portion 272 and disposed at both ends of the first branch 271a.

The first branch 271a makes an angle of about 10° with respect to the rubbing direction of the alignment layer, and the second branch 271b may be further curved at an angle about 7° to 15° with respect to the first branch 271a.

To the extent possible, without changing the configuration of the embodiment in FIG. 9, some or all of the features of exemplary embodiments which have been described above with reference to FIG. 1 to FIG. 3, FIG. 5, FIG. 6, FIG. 7, and FIG. 8 can be applied to the exemplary embodiment shown in FIG. 9 and FIG. 10.

In the exemplary embodiments described above, although the pixel electrode has a surface shape without a specific pattern in the pixel area and the reference electrode is composed of a plurality of linear branch electrodes and branch electrode connecting portions that connect the branch electrodes, the embodiments of the present invention are not limited thereto. That is, the reference electrode may have a surface shape without a specific pattern in the pixel area and may be composed of a plurality of linear branch electrodes and branch electrode connecting portions that connect the branch electrodes. Further, the embodiments of the present invention may be applied when the color filter and the light blocking layer are positioned on the insulating layer, in addition to when the color filter and the light blocking layer are formed on an upper substrate.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a first display panel including a plurality of pixel areas;
a second display panel positioned opposite to the first display panel;
a liquid crystal layer disposed between the first display panel and the second display panel; and
a plurality of spacers maintaining a distance between the first display panel and the second display panel;
wherein the pixel areas include a first pixel area group of pixel areas having the contact holes and a second pixel area group of pixel areas not including the contact holes, and
wherein the first display panel further includes:
a first insulation substrate,
a gate line and a data line formed on the first insulation substrate, wherein the gate line and data line are insulated from and intersect each other,
a reference voltage line parallel with the gate line and an extender protruding from the reference voltage line,
a thin film transistor connected with the gate line and the data line;
a pixel electrode connected with the thin film transistor; and a reference electrode having a plurality of branch electrodes overlapping the pixel electrode, wherein an insulating layer is between the reference and pixel electrodes, wherein the reference electrode is connected with the extender through a contact hole of the plurality of contact holes, wherein the reference voltage line and the extender are disposed at the center portion of the pixel areas, wherein the spacers are positioned in respective pixel areas of the second pixel area group and disposed at portions in the respective pixel areas corresponding to where the contact holes are positioned in the pixel areas of the first pixel area group, and wherein the spacers overlap the extender in a pixel area of the second pixel area group.

2. The liquid crystal display of claim 1, wherein each branch electrode of the plurality of branch electrodes has a first branch bent at a first predetermined angle, and a second branch that is bent at a second predetermined angle with respect to the first branch.

3. The liquid crystal display of claim 2, wherein the reference electrode is electrically connected to a reference electrode of an adjacent pixel and further comprises a longitudinal connecting portion overlapping the data line and a transverse connecting portion overlapping the gate line.

4. The liquid crystal display of claim 2, wherein a third branch extends from the first branch and is bent at a third predetermined angle with respect to the first branch, and the third branch is connected with the transverse connecting portion.

5. The liquid crystal display of claim 3, wherein the longitudinal connecting portion includes a cutout extending along the data line.

6. The liquid crystal display of claim 2, wherein the data line includes a first bend bent at the same angle as the first predetermined angle of the first branch and the second bend bent at the same angle as the second predetermined angle of the second branch.

7. The liquid crystal display of claim 6, wherein the pixel electrode includes a pair of curved sides, each curved side having portions parallel with the first bend and the second bend.

8. The liquid crystal display of claim 7, further comprising a horizontal alignment layer on the first insulation substrate, wherein the first bend makes an angle of about 5° to about 10° with respect to a rubbing direction of the alignment layer.

9. The liquid crystal display of claim 8, wherein the second bend makes an angle of about 7° to about 15° with respect to the first bend.

10. The liquid crystal display of claim 1, further comprising a color filter formed on the first display panel or the second display panel in a pixel area, wherein the color filter is one of a red color filter, a green color filter, and a blue color filter, and the green color filter is positioned in a pixel area of the second pixel area group.

11. The liquid crystal display of claim 1, further comprising a shield electrode formed on the same layer as the gate line, separated from the gate line, and extending along the data line.

12. The liquid crystal display of claim 1, further comprising a light blocking member disposed on the second display panel at a position corresponding to a spacer of the plurality of spacers.

13. The liquid crystal display of claim 1, wherein the liquid crystal layer has positive dielectric anisotropy.

* * * * *